(No Model.)
M. COURTEMANCHE.
PORTABLE SCAFFOLD.
No. 423,988. Patented Mar. 25, 1890.
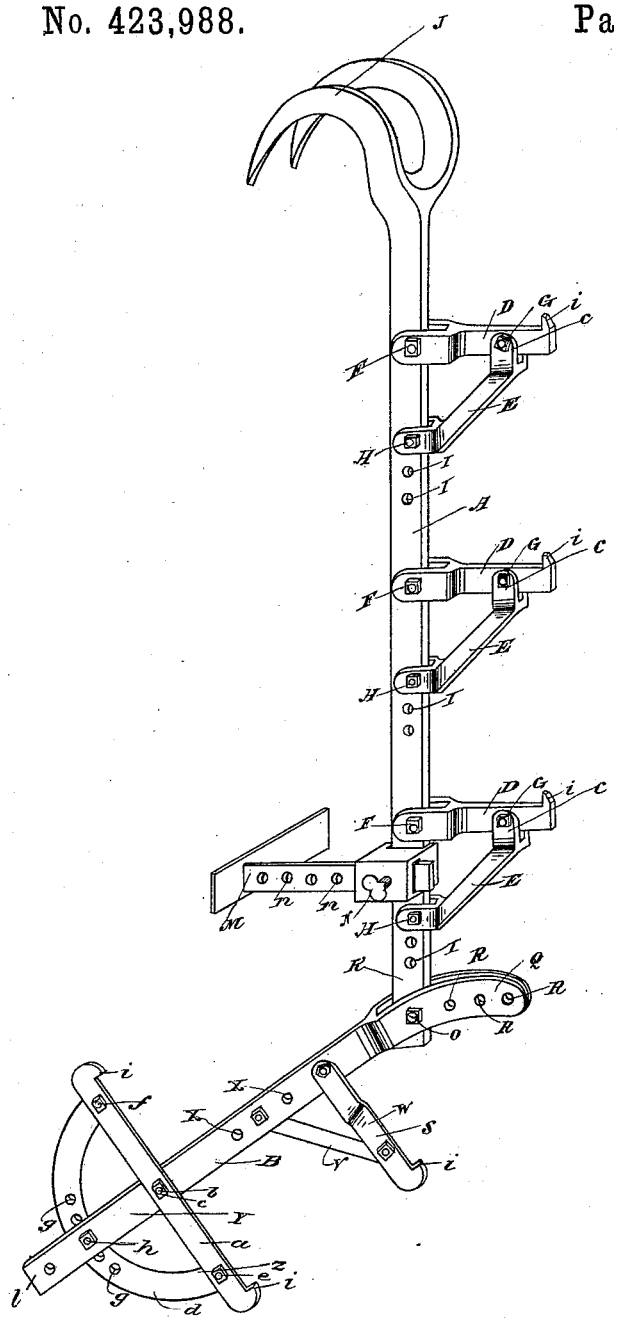
Witnesses.
James Laurin
J. D. Ducharme
Inventor:
Moïse Courtemanche
per: J. Emile Vanier
Attorney.

UNITED STATES PATENT OFFICE.

MOÏSE COURTEMANCHE, OF MONTREAL, QUEBEC, CANADA.

PORTABLE SCAFFOLD.

SPECIFICATION forming part of Letters Patent No. 423,988, dated March 25, 1890.

Application filed July 29, 1889. Serial No. 319,078. (No model.)

*To all whom it may concern:*

Be it known that I, MOÏSE COURTEMANCHE, a citizen of the Dominion of Canada, residing at the city of Montreal, in the district of Montreal and Province of Quebec, Canada, have invented certain new and useful Improvements in Portable Scaffolds; and I do hereby declare the following to be a full, clear, and exact description of the invention, such as will enable others skilled in the art to which it appertains to make and use the same.

My invention has reference to a portable scaffold made out of iron, steel, or any other material found suitable, and used for repairing existing buildings, one of its advantages being that it can be used to repair the inclined portion of roofs as well as the vertical walls.

The object of my invention is to provide a portable scaffold of great strength as well as ease of attachment and displacement.

Referring to the drawing, similar letters refer to similar parts, it being a perspective view of my portable scaffold.

A is the main bar of the upper portion of my scaffold, and B the main bar of the lower portion. The bar A is provided with any number of suitable brackets C, composed of the piece D and the struts E, and is made of any desired length and size to suit. The pieces D are joined to the bar A by means of the rivets or bolts F, and the pieces E are joined to the pieces D by means of the bolts or rivets G and to the bar A by means of the bolts H, the bar A being pierced by the holes I and provided with the forked grip J, which can be made as shown on the drawing or in any other suitable manner. The lower portion K of the bar A is provided with the T-shaped piece M, which can be moved up and down the bar A, and is secured to it by means of the thumb-screw N, which is introduced into one of the holes I. The bar B, which is joined to the bar A at its lower extremity K by means of the bolt O, has the form shown in the drawing, its end Q being forked and provided with the holes R, the object of which shall be explained hereinafter. This bar B is also provided with any suitable number of brackets S, composed of the piece W and strut V and pierced with any suitable number of holes X. The lower portion Y of this bar B is provided with the double bracket Z, composed of the piece $a$, pivoted at $b$, where it is joined to the bar B by means of the bolt or rivet $c$, around which it can oscillate. To the piece $a$ is joined the sector $d$ at $e$ and $f$, this sector being provided with several holes $g$ and secured to the bar A by means of the bolt $h$. The end Q of the bar B is curved, as shown, and the latter can be made of any length and size to suit.

Now the way to employ my portable scaffold is very simple. Let us suppose it is a roof that has to be repaired. In this case the bar A only is sufficient. However, the bar A, or A and B combined, cannot be used alone, but two, three, &c., of them, so that planks can be put on the brackets C or S, where they are kept from falling out by means of the projections $i$. In the case considered the grip J is passed over the ridge of the roof, the brackets C put as near horizontal as wanted by lowering the points of attachment H, planking put on the brackets C, and everything is ready. The piece M, however, can be dispensed with here. If it were the walls of the building that wanted repairing, it also might be possible to use only the bar A, provided this time with the projection M, which can be lengthened or shortened at will by means of the holes $n$, to approach the scaffold as close to the wall as desired, the grip J being hooked into a window-opening or any suitable place, the brackets, placed horizontal or otherwise, as desired, covered with planks, and everything is ready. However, in the case of repairing a French roof, both the bars A and B must be used. The grip J being hooked over the ridge of the roof, the bar B will take the slope of the steep portion of the roof, the piece M serving to keep the bar A off the top portion of the roof, then the bracket or brackets S and Z inclined to suit, and proceed as before.

In the case where the bar A alone should not be long enough to repair a wall, B may also be used; but if the planking were put on the bracket Z there would be a tendency to shove the scaffold away from the building. To remedy this, I make use of the curved end Q of the bar B, which rests against the end K of the bar H, as shown in the figure, or against the nearest strut E, while if a vertical scaffold were desired the bar B could be secured by means of a hole nearer its upper extremity. The bracket Z being made to oscillate, it can always be put horizontal, while its end $l$ serves to keep it at the right distance from the building. The curvature of end Q permits its upper end to bear against the lowest strut E, when the part B is arranged vertical or in line with part A, and the boards are placed upon that part of bracket Z which comes nearest the wall; but for the contact of curved end Q with the strut a heavy weight upon the boards would force the lower end $l$ of part B away from the wall.

It is evident that this mode of scaffolding could also be used in certain cases during the construction of new buildings, &c.

Having described my invention, what I claim, and desire to secure by Letters Patent, is—

1. The combination, with the bar A, provided with a hooked upper end, of a longitudinally and vertically adjustable piece M, connected to the lower part of said bar, and the scaffold-brackets secured to the opposite side of bar A from said piece M, substantially as and for the purpose set forth.

2. The combination, with the scaffold-bracket bar A, provided with a hooked upper end, of the scaffold-bracket bar B, provided with a forked and curved upper end pivoted to the lower end of said bar A, and adapted to be secured at an angle or in line with said bar, substantially as and for the purpose set forth.

3. The combination, with the scaffold-bracket-bar A, of the scaffold-bracket bar B, having its upper end pivoted to the lower end of said bar A, and the double bracket Z, pivoted to said bar B and provided with a sector, and a bolt for securing said sector to bar B after the position of the bracket has been adjusted, substantially as and for the purpose set forth.

In testimony whereof I affix my signature in presence of two witnesses.

MOÏSE COURTEMANCHE.

Witnesses:
J. EMILE VANIER,
JAMES LAURIN.